US012587492B2

(12) United States Patent
Navarro Alvarez et al.

(10) Patent No.: US 12,587,492 B2
(45) Date of Patent: Mar. 24, 2026

(54) HANDLING RESETS

(71) Applicant: Arm Limited, Cambridge (GB)

(72) Inventors: José Antonio Navarro Alvarez,
Cambridge (GB); Richard Ryo Green,
Little Eversden (GB); **Alex James
Waugh**, Cambridge (GB)

(73) Assignee: Arm Limited, Cambridge (GB)

( * ) Notice: Subject to any disclaimer, the term of this
patent is extended or adjusted under 35
U.S.C. 154(b) by 339 days.

(21) Appl. No.: 18/498,246

(22) Filed: Oct. 31, 2023

(65) Prior Publication Data

US 2025/0141818 A1 May 1, 2025

(51) Int. Cl.
H04L 49/253 (2022.01)
H04L 69/22 (2022.01)

(52) U.S. Cl.
CPC ............ H04L 49/254 (2013.01); H04L 69/22
(2013.01)

(58) Field of Classification Search
None
See application file for complete search history.

(56) References Cited

U.S. PATENT DOCUMENTS

| | | |
|---|---|---|
| 7,668,089 B1 | 2/2010 | Srinivasan et al. |
| 2002/0009079 A1 | 1/2002 | Jungck et al. |
| 2004/0006725 A1 | 1/2004 | Lakshmanamurthy et al. |
| 2013/0279340 A1 | 10/2013 | Nakash et al. |
| 2020/0374377 A1 | 11/2020 | Martins et al. |

OTHER PUBLICATIONS

Combined Search and Examination Report for GB Application No.
2402365.7 dated Aug. 28, 2024, 5 pages.

*Primary Examiner* — Robert M Morlan
(74) *Attorney, Agent, or Firm* — NIXON &
VANDERHYE P.C.

(57) ABSTRACT

An apparatus has bridge circuitry to communicate transport
packets between a transport network and data processing
circuitry. Some or all of the data processing circuitry oper-
ates in a given reset domain other than the reset domain of
the transport network. The apparatus also has packet track-
ing circuitry to monitor the transport packets received at the
bridge circuitry and to track whether any required responses
have been provided. The reset handling circuitry is respon-
sive to a reset request for the given reset domain to: cause
the bridge circuitry to reject new transport packets received
for the domain; and when the packet tracking circuitry
indicates that all required responses have been provided,
accept the reset request for the given reset domain and allow
the data processing circuitry to carry out a reset for the data
processing circuitry operating in the given reset domain.

20 Claims, 14 Drawing Sheets

| packet ID | origin reset domain | target reset domain | valid |
|-----------|--------------------|--------------------|-------|

HANDLING RESETS

BACKGROUND

The present technique relates to the field of data process-ing. More particularly, the invention relates to handling resets.

A data processing system can have a plurality of reset domains such that when a reset in a specific reset domain is asserted, existing data associated with that specific reset domain is discarded. When communicating between differ-ent elements of the system, data may be transferred over a transport network. Typically, this transport network will be operating in a different reset domain to at least some of the source and destination elements coupled to it such that when a reset domain is asserted in certain reset domains of the source or destination elements, a reset is not asserted in the transport network.

SUMMARY

In one example arrangement, there is provided an appa-ratus comprising: bridge circuitry operable to communicate transport packets between a transport network and data processing circuitry, at least a portion of the data processing circuitry operating in a given reset domain other than a reset domain of the transport network; packet tracking circuitry to monitor the transport packets received at the bridge circuitry and, for transport packets that require a response by the data processing circuitry, to track whether the response has been provided; and reset handling circuitry responsive to a reset request for the given reset domain to: cause the bridge circuitry to reject new transport packets received for the given reset domain; and when the packet tracking circuitry indicates that a response has been provided for the transport packets associated with the given reset domain that require a response, accept the reset request for the given reset domain and allow the data processing circuitry to carry out a reset for the at least a portion of the data processing circuitry operating in the given reset domain.

In another example arrangement, there is provided a system comprising: the apparatus of any preceding claim, implemented in at least one packaged chip; at least one system component; and a board, wherein the at least one packaged chip and the at least one system component are assembled on the board.

In another example arrangement, there is provided a chip-containing product comprising the system assembled on a further board with at least one other product compo-nent.

In another example arrangement, there is provided a non-transitory computer-readable medium to store com-puter-readable code for fabrication of an apparatus compris-ing: bridge circuitry operable to communicate transport packets between a transport network and data processing circuitry, at least a portion of the data processing circuitry operating in a given reset domain other than a reset domain of the transport network; packet tracking circuitry to monitor the transport packets received at the bridge circuitry and, for transport packets that require a response by the data pro-cessing circuitry, to track whether the response has been provided; and reset handling circuitry responsive to a reset request for the given reset domain to: cause the bridge circuitry to reject new transport packets received for the given reset domain; and when the packet tracking circuitry indicates that a response has been provided for transport packets associated with the given reset domain that require a response, accept the reset request for the given reset domain and allow the data processing circuitry to carry out a reset for the at least a portion of the data processing circuitry operating in the given reset domain.

In another example arrangement, there is provided a method of handling resets, the method comprising: commu-nicating transport packets between a transport network and data processing circuitry, at least a portion of the data processing circuitry operating in a given reset domain other than a reset domain of the transport network; monitoring the transport packets received and, for transport packets that require a response by the data processing circuitry, tracking whether the response has been provided; responsive to a reset request for the given reset domain: causing the bridge circuitry to reject new transport packets received for the given reset domain; and further in response to the tracking indicate that a response has been provided for transport packets associated with the given reset domain that require a response, accepting the reset request for the given reset domain and allowing the data processing circuitry to carry out a reset for the at least a portion of the data processing circuitry operating in the given reset domain.

BRIEF DESCRIPTION OF THE DRAWINGS

Further aspects, features, and advantages of the present technique will be apparent from the following description of examples, which is to be read in conjunction with the accompanying drawings.

FIG. 7 schematically illustrates an entry of in-flight packet tracking information;

DESCRIPTION OF EXAMPLES

Figure 1:
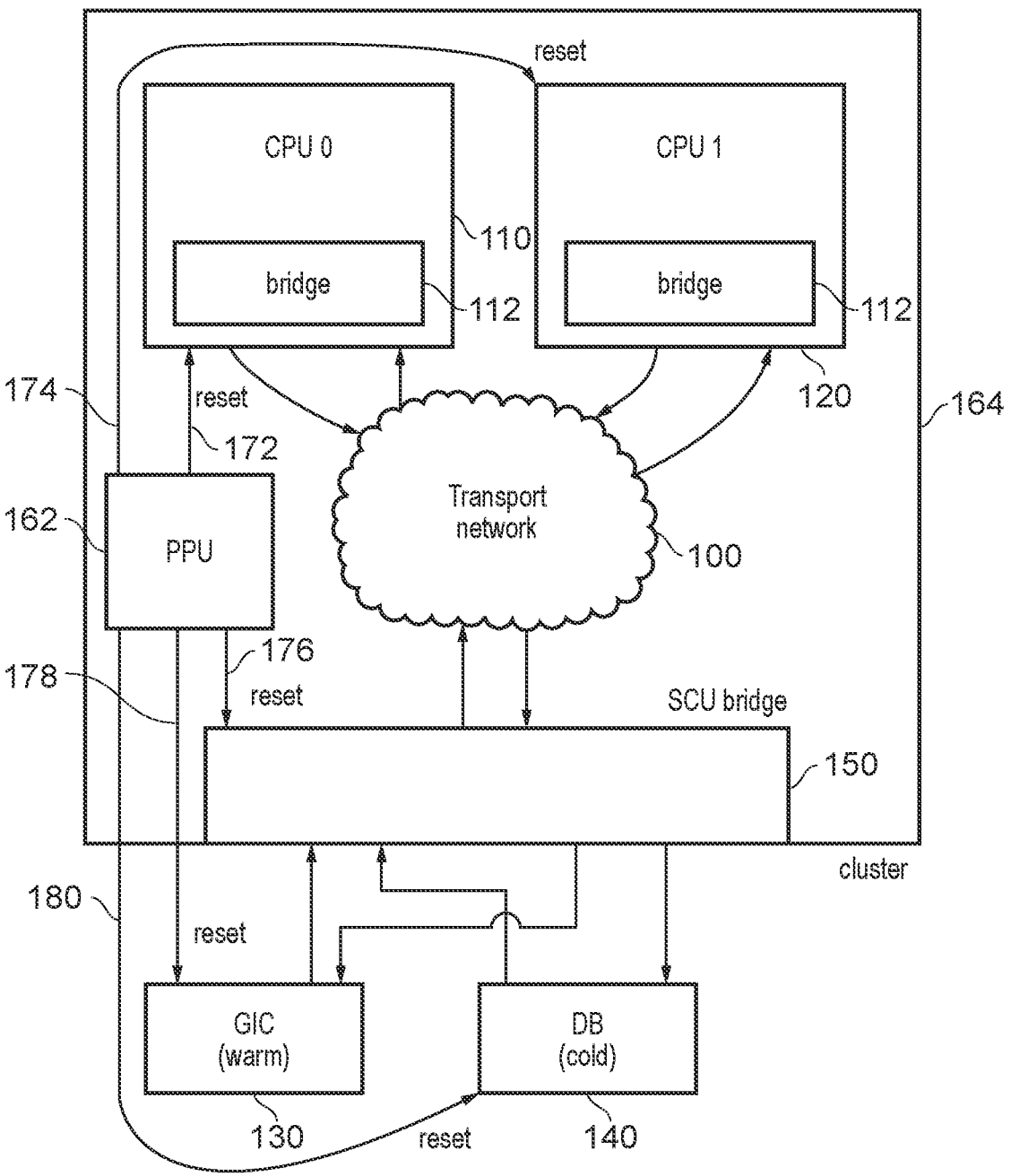
FIG. 1 schematically illustrates a system with elements of data processing circuitry in communication over a transport network.

Before discussing the examples with reference to the accompanying figures, the following description of examples is provided.

An integrated circuit may have many elements of data processing circuitry (or devices) that are required to be in communication. For instance, a Generic Interrupt Controller (GIC) may need to be able to transfer data indicative of an interrupt to a central processing unit (CPU). To connect these elements of data processing circuitry, a transport network is provided over which data, which may be in the form of transport packets, can be transferred from a source element to a destination element. The data processing circuitry may be operable as both a sender and receiver device configured to send and receive transport packets over the transport network. In some cases, the data processing circuitry may be only a responder able to receive requests from other devices and provide responses but unable to initiate requests of its own.

In general, there will be many elements of data processing circuitry and the transport network may interconnect all or some of these elements so that many possible communication paths are supported by the transport network. Indeed, it may be possible for all elements to send data to and receive data from all other elements. Alternatively, some elements may be configured to only communicate with certain other elements, or elements may be configured to only perform one of sending and receiving data.

Each element of data processing circuitry belongs to a reset domain, although some devices may contain elements of data processing circuitry in different reset domains. A reset specifying a given reset domain can be asserted such that it acts in a given reset domain but does not affect at least one other reset domain. Hence, certain reset domains can be selected for a reset to occur in without triggering a reset of another reset domain. A reset domain may include many elements.

Because the transport network may handle data originating from multiple reset domains, the reset domain of the transport network is typically one such that a reset is not effected in the transport network unless a reset is also being effected in all of the other reset domains. Thus, when this occurs, all data that is being transferred will be lost, and so this may effectively act as a reset of the whole system.

Hence, it will often be the case that a reset may be asserted in a given reset domain without the transport network being subjected to a reset, which can cause issues with regard to correct handling of packets by the transport network to take account of the reset state of that reset domain. For instance, while a packet originating from a given reset domain is being transmitted on the transport network, a reset of that given reset domain could be asserted. As mentioned above, this packet could arrive at its destination despite the reset of the given reset domain, and this can lead to protocol violations or deadlocks since the destination element may no longer be expecting the request or reply that the packet represents.

In some cases, it is expected that all or a subset of transport packets sent via the transport network will receive a reply (or will be a reply to another packet). For example, the transport packets may be sent according to a protocol that specifies that sending devices can expect to receive a response back in reply to request packets that they send to receiving devices. If a device (also referred to as data processing circuitry or an element of data processing circuitry) sends a transport packet expecting a reply and no such reply is received, this can lead to deadlocks where the sending device is left waiting for the reply. It is therefore important, when asserting a reset in a given domain, to ensure that any request packets are responded to before the reset is asserted.

An issue may occur where a sending device in a first reset domain sends a request packet to a receiving device in a second reset domain and a reset is then asserted in the second reset domain. If the receiving device (operating in the second reset domain for which the reset is asserted) drops the incoming request packet or otherwise omits to provide a response as expected, the sending device in the first reset domain (for which a reset is not asserted) may encounter a deadlock as it waits for the response.

In accordance with the techniques described herein, there is therefore provided an apparatus with packet tracking circuitry to monitor the packets received by a receiving device and to track for which of the received transport packets for which a response is required a reply has been provided for. A handshake process is then applied to initiate a reset in the receiving device (or a reset domain thereof) whereby a reset request associated with a reset domain of the receiving device (or a portion thereof) is first asserted and only accepted once all required responses have been provided. Thus, even if the data processing circuitry is ready to carry out the reset, before the reset request is accepted and the receiving device (or portion thereof) is allowed to carry out the reset for the requested reset domain, the receiving device must wait until a response has been provided for any transport packets for which a response is required. Once the required responses have been provided, the receiving device can accept the reset request and allow the reset in the specified reset domain to occur.

This approach mitigates against the risk of deadlocks occurring due to a device taking a reset before all outstanding received packets for which a response is expected are responded to. The approach described herein also operates without the need for a dedicated packet type to mark the boundary between transport packets arriving before a reset has been asserted/deasserted and those arriving after. Accordingly, this approach reduces the number of packets to be handled and removes the need for a dedicated packet ID to be accommodated for such a dedicated packet type. Additionally, this approach can be implemented relatively easily within device that implements a protocol that makes use of reset request and reset acceptance signals.

In accordance with the techniques described herein, there is therefore provided an apparatus with bridge circuitry that communicates transport packets between a transport network (such as an interconnect) and data processing circuitry. The data processing circuitry may in some examples be a processing unit (e.g., a CPU or GPU) or may be an element of memory, a generic interrupt controller, or a debug block. It will be appreciated that other forms of data processing circuitry may be used in accordance with the present techniques. The bridge circuitry is operable with data processing circuitry of which at least a portion operates in a different reset domain to the transport network. In some examples, the reset domain of the transport network is referred to as a cold reset domain for which, when a cold reset is asserted, a reset is performed everywhere. Other components may operate in a warm reset domain such that when a warm reset is asserted, components operating in the warm reset domain encounter the reset but components in the cold reset domain do not. In some examples, further reset domains may be provided.

While the entirety of the data processing circuitry may be implemented in the reset domain other than the transport domain (e.g., the warm reset domain), in some examples, the data processing circuitry contains portions operating in more than one domain. For example, some components of the data processing circuitry may operate in the warm reset domain and other components of the data processing circuitry may operate in the cold reset domain.

The apparatus is also provided with packet tracking circuitry which monitors the transport packets received at the bridge circuitry. For the transport packets received by the data processing circuitry and for which a response is required, the packet tracking circuitry can track whether a response has been provided. In some examples, all packets received by the data processing circuitry may require a response; however, in some examples only certain types of packets (e.g., request packets) will require a response to be provided by the data processing circuitry.

Reset handling circuitry is also provided to handle the taking of resets at the data processing circuitry. The reset handling circuitry makes use of a handshake procedure. Initially a reset request for a given reset domain is received by the reset handling circuitry (e.g., from a power policy unit (PPU)) requesting that a certain reset be initiated.

Once the reset request has been received, the reset handling circuitry causes the bridge circuitry to reject new transport packets received for the given reset domain. To comply with the requirement that certain packets (such as request packets) receive a response, or otherwise to notify the sending device that the new transport packet has not been accepted, the reset handling circuitry, may cause a rejection packet to be sent in response to the new transport packet as part of this rejection.

Rather than immediately enforcing the reset, the reset handling circuitry determines, based on whether a response has been provided to any transport packets that require a response, whether it is safe to take the reset. This determination is done with reference to the packet tracking circuitry which determines, based on the reset domain from which the packets originated, the transport packets for which a response is required before the reset can be taken.

In some cases, the packet tracking circuitry may require that all transport packets received for the given reset domain of the data processing circuitry are responded to or may require that a response is required for a certain type of transport packets such as request packets. However, in some examples, for transport packets (including request packets) that originated in the same reset domain as the reset domain to which the reset request relates, the packet tracking circuitry may determine that there is no need to provide a response since the requesting device will also be subject to the same reset. On the other hand, the packet tracking circuitry may require responses to be provided for any transport packets originating from the given reset domain for which the reset request has been issued. This may be done for example, in case the reset request is declined and so the reset does not occur, to comply with requirements of the communication protocol, or to simplify the implementation of the packet tracking circuitry. The transport network and data processing circuitry may support types of transport packets other than request packets. Such other types of transport packet may not require a response and so the packet tracking circuitry may not require that a response is provided for these other types of transport packets before the reset request is accepted.

Once the packet tracking circuitry indicates that a response has been provided for the transport packets requiring a response and associated with the reset domain, the reset handling circuitry accepts the reset request (e.g., by sending a reset acceptance signal to the PPU) and allows the data processing circuitry or the portion thereof that operates in the reset domain for which the reset has been asserted to carry out the reset.

In this way, the reset handling circuitry is able to mitigate against the risk that any transport packets received at the data processing circuitry that require a response to be provided, will not be responded to as a result of a reset being taken.

In response to receiving the reset request, the reset handling circuitry may also provide an indication to the at least a portion of the data processing circuitry to which the reset relates that the reset request has been received. The at least a portion of the data processing circuitry may then confirm to the reset handling circuitry when the data processing circuitry is ready to carry out the reset. It should be appreciated that even where the data processing circuitry indicates to the reset handling circuitry that the data processing circuitry is ready to carry out the reset, if the reset handling circuitry determines, with reference to the packet tracking circuitry, that a response has not been provided for all transport packets requiring a response, the reset handling circuitry will prevent the reset being taken. This may be done on the basis that the data processing circuitry may indicate that is ready for the reset to be taken before all of the transport packets have been responded to (i.e., the data processing circuitry may not track itself whether all outstanding transport packets requiring a response have been handled) and so it may not be sufficient to rely on the indication from the data processing circuitry itself in order to prevent responses being missed for transport packets.

In some examples, the portion of the data processing circuitry for which the reset is carried out, does not itself have visibility of the reset and/or does not require any processing by the data processing circuitry to effect the reset. Rather, the reset may be enforced by power control circuitry once the reset handling circuitry indicates that is safe to initiate the reset.

Once the reset has been asserted in the reset domain, the data processing circuitry (or portion thereof) may be unable to generate new transport packets. However, between the reset request being received and the reset being asserted, the data processing circuitry is able to generate transport packets (for example the responses to the received request packets). During this period, the reset handling circuitry may prevent the data processing circuitry from generating new request packets on the basis that these requests will become redundant and will likely be dropped by the recipient once the reset has been asserted.

To handle deassertion of a reset, the reset handling circuitry may be responsive to a reset deassertion request (e.g., received from the PPU) allow the data processing circuitry (or portion thereof) to deassert the reset and transition to an "awake" state again. The reset handling circuitry also ceases rejecting new transport packets for the reset domain and accepts the deassertion request.

In some examples, only two reset domains are provided (e.g., a cold reset domain and a warm reset domain as described above). However, in general a plurality of reset domains may be employed. For example, and as illustrated below with respect to the figures, a cold reset domain, warm reset domain A and warm reset domain B may be employed. In such examples, where a first portion of the data processing circuitry operates in warm reset domain A, a second portion of the of the data processing circuitry may operate in warm reset domain B (and further a third portion of the data processing circuitry may operate in the cold reset domain). In this case, the bridge circuitry is responsive to transport packets destined for the second portion of the data processing circuitry (associated with warm reset domain B) while the reset in the warm reset domain A is asserted to communicate the transport packets to the second portion of the data processing circuitry. Since the reset is not asserted in warm reset domain B, these transport packets can still be communicated to the warm reset domain B. Similarly, any traffic for the cold reset domain can be communicated to the portions of data processing circuitry in the cold reset domain while the cold reset is not asserted.

However, when a reset request is received for the warm reset domain B (which may also be referred to as a third reset domain), the reset handling circuitry implements a similar process as described above for the given reset domain. Specifically, the reset handling circuitry causes the bridge circuitry to reject new transport packets received for warm reset domain B and delays accepting the reset request for warm reset domain B until the packet tracking circuitry indicates that a response has been provided for all transport packets associated with warm reset domain B that require a response. Once all of the required responses have been provided, the reset handling circuitry accepts the reset request and allows the data processing circuitry to carry out warm reset B.

So that the reset handling circuitry and the packet tracking circuitry continue to operate to ensure that resets are properly handled, the reset handling circuitry and the packet handling circuitry may be implemented in the same reset domain as the transport network. Typically, the transport network operates in a reset domain (termed a cold reset domain) for which, if a reset is taken, a reset is also taken in all other reset domains. Hence, with the reset handling circuitry and the packet tracking circuitry in the same reset domain as the transport network, unless a reset of all components is asserted in which case all traffic will be dropped anyway, the reset handling circuitry and the packet tracking circuitry will be active.

Thus, if the reset handling circuitry receives a reset request for the reset domain of the transport network, there is no need to monitor whether a response has been provided for all outstanding transport packets requiring a response as the requesting device is expected to be subject to the cold reset as well and the transport network will be reset, dropping the traffic being handled by the network at the time. Therefore, in response to a reset request of the reset domain of the transport network, the reset handling circuitry can accept the reset request and allow the data processing to carry out the reset.

In order to track the transport packets that require a response by the data processing circuitry, the packet tracking circuitry maintains in-flight packet tracking information to identify the received transport packets that require a response by the data processing circuitry. When a new transport packet is received for data processing circuitry in a particular reset domain, as long as a reset request is not asserted for that particular reset domain already, the packet tracking circuitry adds a packet tracking information entry to the in-flight packet tracking information to identify the new transport packet and the reset domain with which it is associated.

Then, when a response is sent by the data processing circuitry in response to that transport packet, the packet tracking circuitry can update the packet tracking information entry to indicate that the requested response has been provided. In this way, the packet tracking circuitry can monitor the outstanding transport packets for which a response has not yet been provided. Accordingly, when a reset request is received for that reset domain, the packet tracking circuitry can identify whether all of the required responses have been provided to transport packets by referencing the packet tracking information entries.

Concepts described herein may be embodied in computer-readable code for fabrication of an apparatus that embodies the described concepts. For example, the computer-readable code can be used at one or more stages of a semiconductor design and fabrication process, including an electronic design automation (EDA) stage, to fabricate an integrated circuit comprising the apparatus embodying the concepts. The above computer-readable code may additionally or alternatively enable the definition, modelling, simulation, verification and/or testing of an apparatus embodying the concepts described herein.

For example, the computer-readable code for fabrication of an apparatus embodying the concepts described herein can be embodied in code defining a hardware description language (HDL) representation of the concepts. For example, the code may define a register-transfer-level (RTL) abstraction of one or more logic circuits for defining an apparatus embodying the concepts. The code may define a HDL representation of the one or more logic circuits embodying the apparatus in Verilog, SystemVerilog, Chisel, or VHDL (Very High-Speed Integrated Circuit Hardware Description Language) as well as intermediate representations such as FIRRTL. Computer-readable code may provide definitions embodying the concept using system-level modelling languages such as SystemC and SystemVerilog or other behavioural representations of the concepts that can be interpreted by a computer to enable simulation, functional and/or formal verification, and testing of the concepts.

Additionally or alternatively, the computer-readable code may define a low-level description of integrated circuit components that embody concepts described herein, such as one or more netlists or integrated circuit layout definitions, including representations such as GDSII. The one or more netlists or other computer-readable representation of integrated circuit components may be generated by applying one or more logic synthesis processes to an RTL representation to generate definitions for use in fabrication of an apparatus embodying the invention. Alternatively or additionally, the one or more logic synthesis processes can generate from the computer-readable code a bitstream to be loaded into a field programmable gate array (FPGA) to configure the FPGA to embody the described concepts. The FPGA may be deployed for the purposes of verification and test of the concepts prior to fabrication in an integrated circuit or the FPGA may be deployed in a product directly.

The computer-readable code may comprise a mix of code representations for fabrication of an apparatus, for example including a mix of one or more of an RTL representation, a netlist representation, or another computer-readable definition to be used in a semiconductor design and fabrication process to fabricate an apparatus embodying the invention. Alternatively or additionally, the concept may be defined in a combination of a computer-readable definition to be used in a semiconductor design and fabrication process to fabricate an apparatus and computer-readable code defining instructions which are to be executed by the defined apparatus once fabricated.

Such computer-readable code can be disposed in any known transitory computer-readable medium (such as wired or wireless transmission of code over a network) or non-transitory computer-readable medium such as semiconductor, magnetic disk, or optical disc. An integrated circuit fabricated using the computer-readable code may comprise components such as one or more of a central processing unit, graphics processing unit, neural processing unit, digital signal processor or other components that individually or collectively embody the concept.

Particular examples will now be described with reference to the figures.

FIG. 1 illustrates a cluster 164 of an integrated circuit having two CPUs 110, 120, a transport network 100, a Snoop Control Unit (SCU) bridge 150 and a power policy unit (PPU) 162. In communication with the cluster 164 are a Generic Interrupt Controller (GIC) 130 and a Debug Block (DB) 140. In general, various elements of data processing circuitry may be interconnected using the transport network 100.

The CPUs 110, 120 perform data processing tasks but are also required to be in communication with other devices in the system. The transport network 100 interconnects all of the devices to all of the other devices 110, 120, 130, 140 so that any device 110, 120, 130, 140 can communicate by sending data, in the form of packets, to any other device 110, 120, 130, 140. The SCU bridge 150 provides a connection between the cluster 164 and devices 130, 140 located outside the cluster 164.

Each CPU 110, 120 comprises bridge circuitry 112 which couples the CPU 110, 120 to the transport network 100 and handles the dispatch of packets from the CPU 110, 120 and handles packets received from the transport network for the CPU 110, 120. In a similar manner, the SCU bridge 150 couples the GIC 130 and the DB 140 to the transport network 100. The transport network 100 is connected to both CPUs 110, 120, as well as being coupled to the GIC 130 and the DB 140 via the SCU bridge 150.

The CPUs 110, 120 may in some examples each be configured to have a plurality of elements (or portions of data processing circuitry) that can each communicate over the transport network 100, whilst the GIC 130 and the DB 140 can each be considered to represent a single element.

Each element has an associated reset domain. As illustrated, the GIC 130 is configured to operate in a warm reset domain and the DB 140 is configured to operate in a cold reset domain. In the illustrated example, the CPUs 110, 120 each comprise components that operate in the warm reset domain and components that operate in the cold reset domain.

The elements of data processing circuitry are each able to generate transport packets that are communicated from the source element via the transport network 100 to a destination element. The data processing circuitry (such as the GIC 130, DB 140 and the CPUs 110, 120) are arranged to generate a form of transport packet referred to as a request packet for which a response from the recipient is expected by the sender. If these responses are not provided to the sender element, the sender may encounter a deadlock where it becomes stuck waiting for a response to the request packet. In accordance with the techniques described herein, the bridge circuitry 112, 150 (including the SCU bridge 150) ensures that even where a reset is asserted, the required responses are still provided by a receiver element before the element transitions to the reset state so as to reduce the chance of such deadlocks occurring.

The PPU 162 is able to assert a reset in a given reset domain. For example, in response to a given event, such as a change in state of the system, the PPU 162 may trigger a reset of a reset domain. The PPU 162 issues a reset request to relevant components of the system as depicted by arrows 172, 174, 176, 178, 180 which can then be accepted by the components of the system to signal that the component is transitioning to the reset state. The process by which the bridge circuitry 112, 150 handles the reset requests is discussed in more detail with respect to FIGS. 2A-2D and 3A-3B.

When a reset domain is asserted in the warm reset domain, only traffic in the warm reset domain is discarded and only components in the warm reset domain enter their reset state. However, in this example, a cold reset, i.e. a reset of the cold reset domain, may be effected by removing power from the components. The cold reset is configured to reset devices operating in both the warm and cold reset domains. Upon removing the power, all data being transferred is effectively discarded, including that on the transport network 100. Thus the transport network 100 can be considered to operate in the cold reset domain. By having the transport network 100 only be reset when all other reset domains are reset, data is not lost when a reset of the transport network 100 is asserted and a reset is not asserted elsewhere. According to other examples, the cold reset may be asserted without removing power from the components, with a cold reset signal being issued instead to indicate that a reset should be asserted across all domains.

Figure 2A:
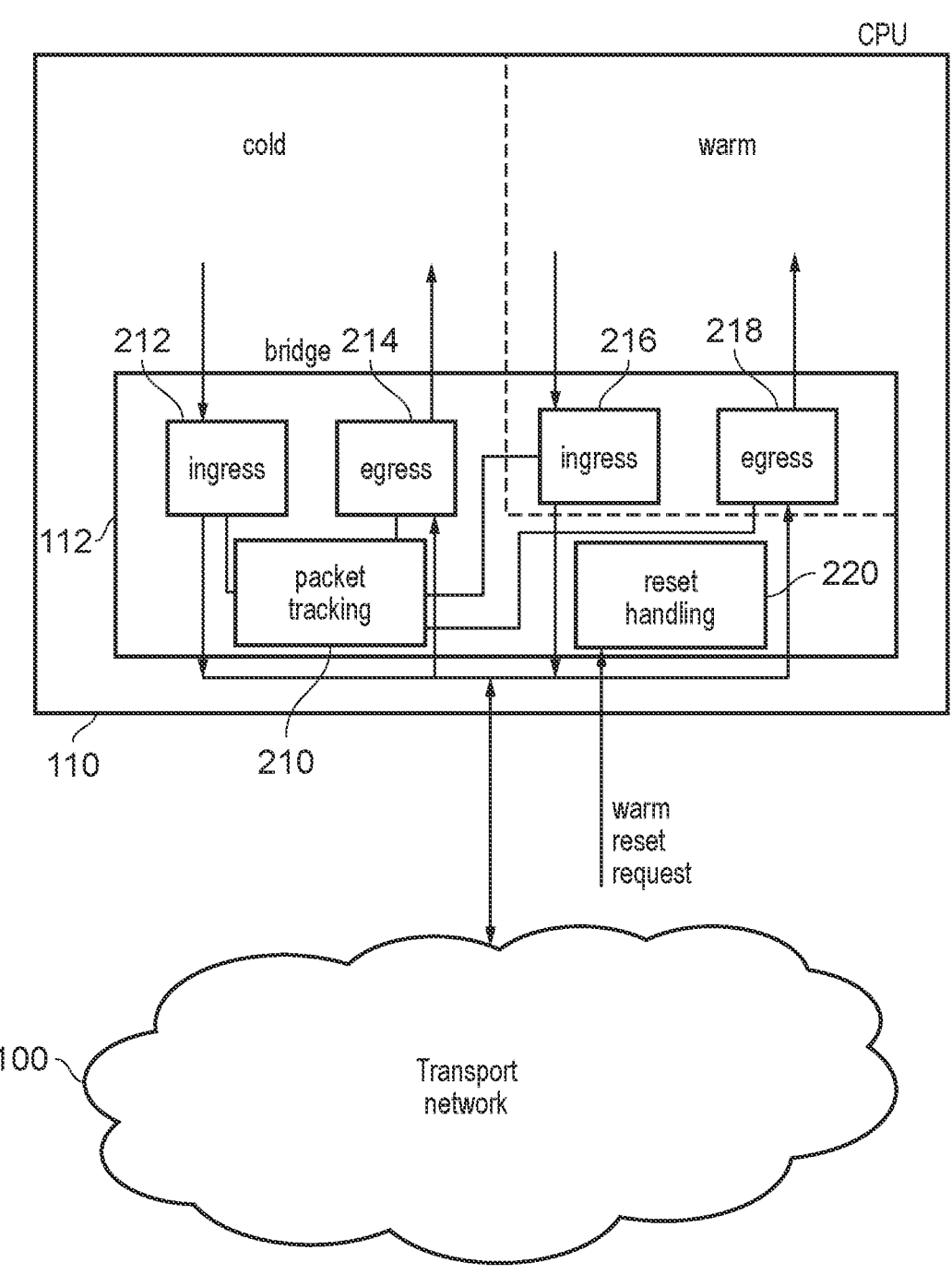
FIGS. 2A-2D schematically illustrate the process of asserting a reset in a reset domain of an element of data processing circuitry.

FIGS. 2A-2D schematically illustrate the process of asserting a reset in a reset domain of an element of data processing circuitry 110. FIG. 2A illustrates the CPU 110 of FIG. 1 in more detail and the transport network 100 to which it is coupled. The CPU 110 has bridge circuitry 112 to handle the reception of transport packets from the transport network 100 and the transmission of transport packets from the CPU 110 via the transport network 110.

Although FIGS. 2A-2D and FIGS. 3A-3B depict the bridge circuitry 112 implemented in the CPU 110, similar bridge circuitry 112 may be provided within other components coupled to the transport network 100 or as the SCU bridge 150.

The CPU 110 has components operating in the cold reset domain and components operating in the warm reset domain as schematically illustrated using the dotted line. The bridge circuitry 112 has ingress and egress circuitry 212, 214, 216, 218 for each of the cold reset domain and the warm reset domain to communicate transport packets between the components of the CPU 110 in the cold reset domain and the warm reset domain respectively. The ingress circuitry 212 and 216 and egress circuitry 214, 218 are labelled with respect to the ingress/egress of transport packets onto the transport network 100 such that the ingress circuitry 212, 216 handles the communication of transport packets from the CPU 110 to the transport network 100 and the egress circuitry 214, 218 handles the communication of transport packets from the transport network 100 to the CPU 110.

In the cold reset domain of the bridge circuitry 112, there is provided packet tracking circuitry 210 that tracks the transport packets received by the CPU 110 and the responses provided to those transport packets. In some examples, the packet tracking circuitry 210 only tracks transport packets requiring a response received at the CPU 110 but in other examples, the packet tracking circuitry 210 may also track transport packets issued by the CPU 110 and whether responses have been received for those packets. The packet tracking circuitry 210 is in communication with the ingress and egress circuitry 212, 214, 216, 218 as shown in FIG. 2A such that it can monitor the transport packets received and sent by the CPU 110.

Figure 2B:
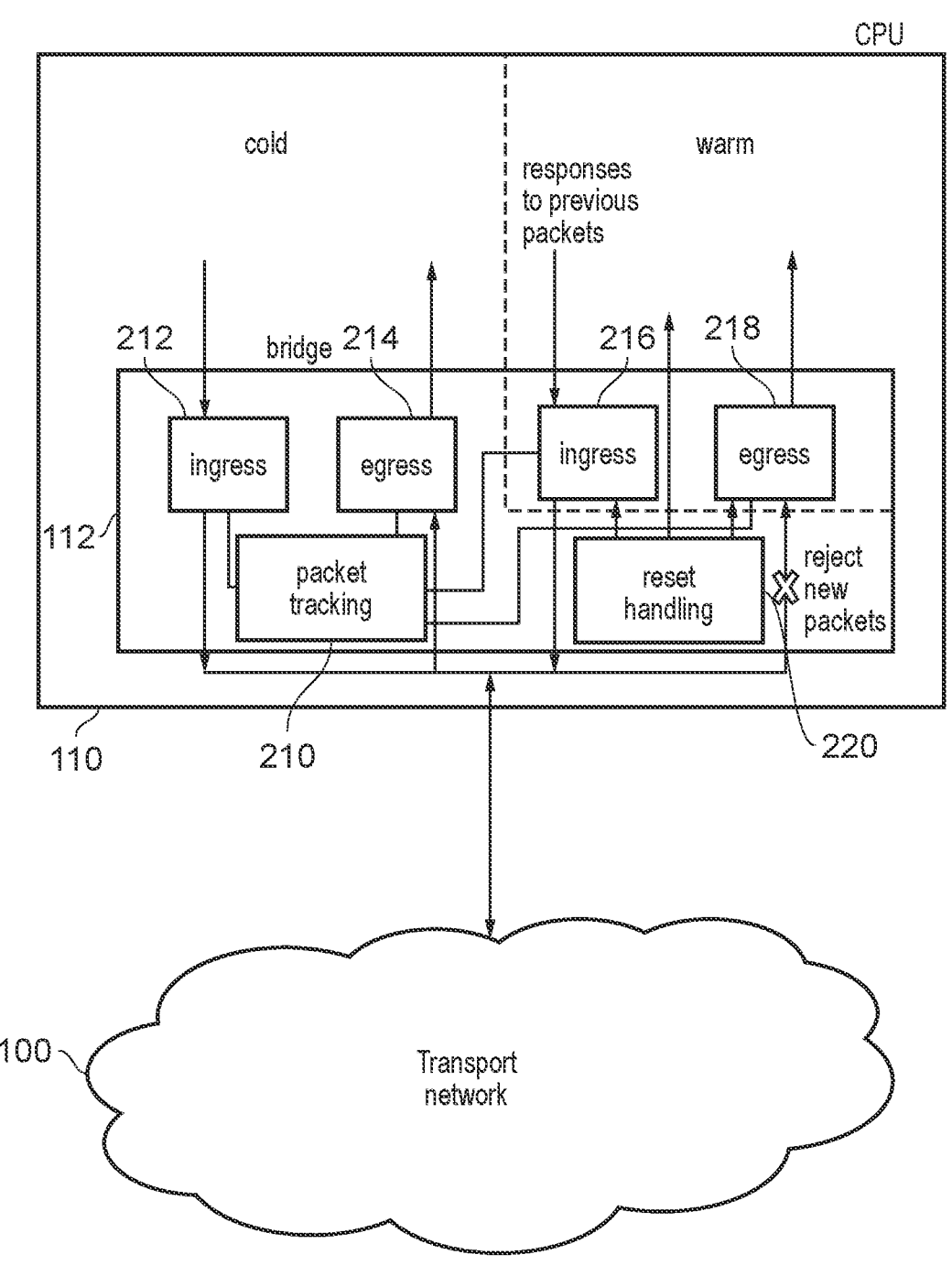
Figure 2C:
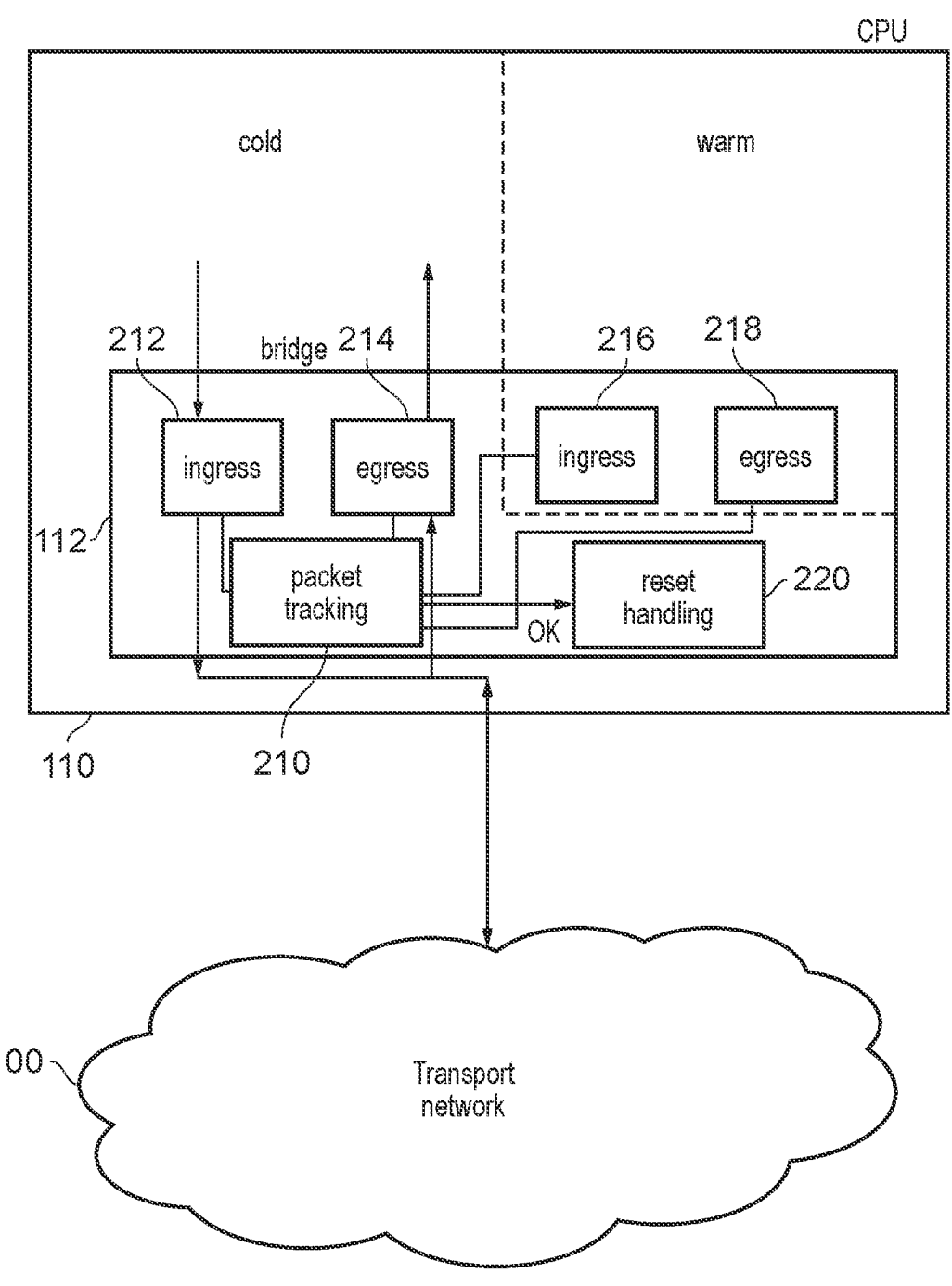
Figure 2D:
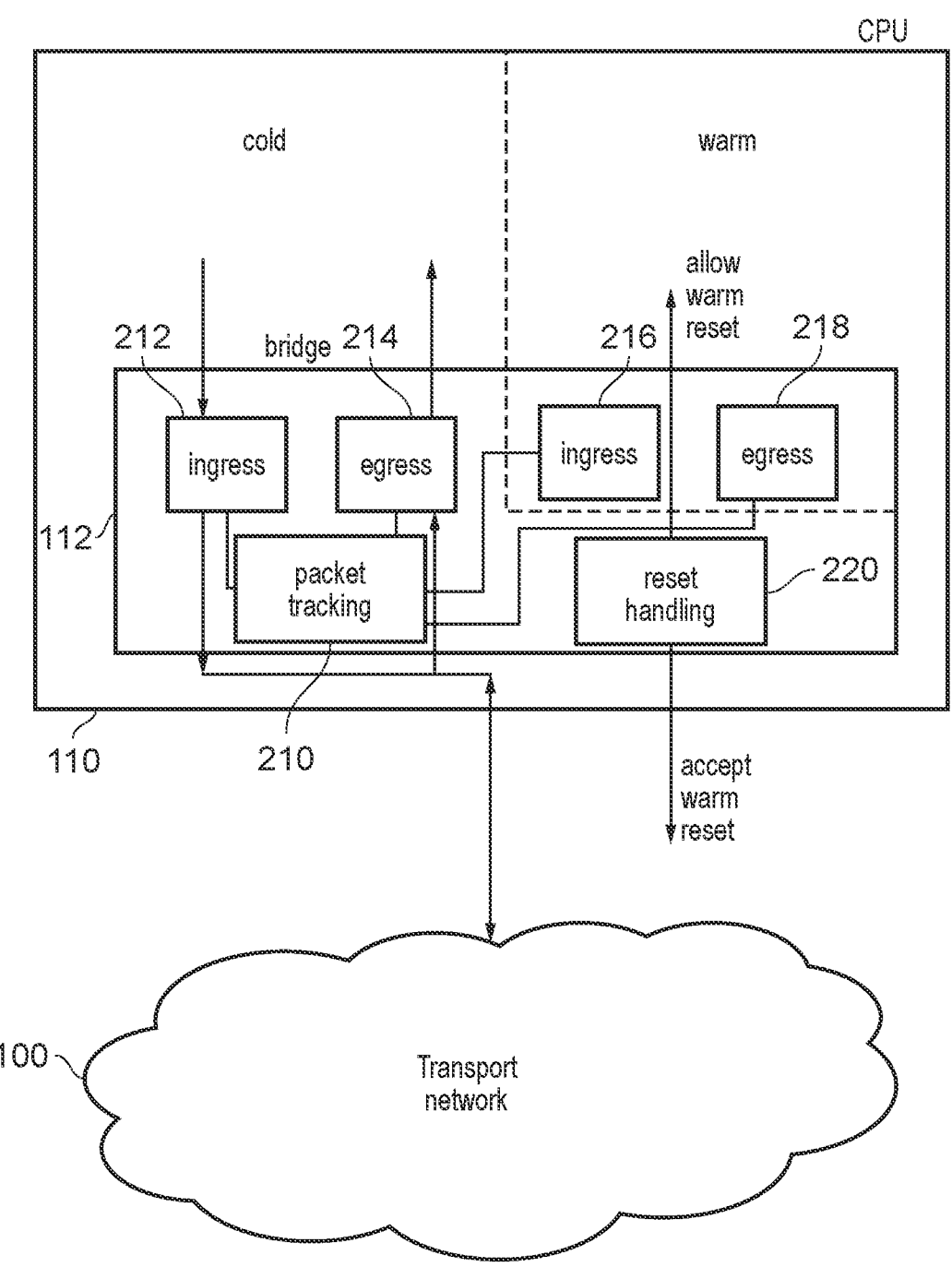

The bridge circuitry 220 is also provided with reset handling circuitry 220 which operates in the cold reset domain of the bridge circuitry 220. The reset handling circuitry is provided to handle reset requests received from the PPU 162 and the operation of the reset handling circuitry in response to a warm reset request is illustrated in FIGS. 2A-2D. FIGS. 2B-2D illustrate the same components as FIG. 2A and a full discussion of these components as presented above will not be repeated.

FIG. 2A shows a warm reset request received by the reset handling circuitry 220.

As shown in FIG. 2B, the reset handling circuitry 220 then notifies the circuitry in the warm reset domain that the warm reset request has been received but at this stage does not allow the warm reset to be taken since the data processing circuitry in the warm reset domain may not yet have responded to all of the received transport packets targeting the warm reset domain that require a response. If the data processing circuitry in the warm reset domain were allowed to initiate the warm reset at this point, devices from which any such transport packets originated could end up in a deadlocked situation waiting for a response from the CPU 110. The reset handling circuitry also prevents new transport packets being accepted into the warm reset domain, for example by responding to such new packets with a rejection packet to notify the sending device that the packet has not been accepted. The CPU 110 may then continue to operate, providing responses to any outstanding transport packets.

These responses are monitored by the packet tracking circuitry 210 which eventually indicates that all of the required responses have been provided, as shown in FIG. 2C. The reset handling circuitry 220 then allows the components of the CPU 110 in the warm reset domain to take the warm reset and notifies the acceptance of the reset to the PPU 162 as indicated in FIG. 2D.

Thus, the reset handling circuitry 220 and the packet tracking circuitry 210 operate to delay the data processing circuitry in the warm reset domain from taking the requested reset until any packets requiring a response have been responded to. In some examples, the transport packets requiring responses are all of the transport packets targeting the warm reset domain or all of a certain type of transport packets (e.g., request packets) targeting the warm reset domain. However, in some examples, the packet tracking circuitry 210 may distinguish between transport packets that originated from the warm reset domain for which the reset is to be asserted and one or more other reset domains such that the packet tracking circuitry 210 only requires that a response be provided for transport packets originating from the one or more other reset domains. This may be done on the basis that the sender of transport packets from the warm reset domain will also be subject to a reset and so there is no/little risk of that sender device encountering a deadlock.

Figure 3A:
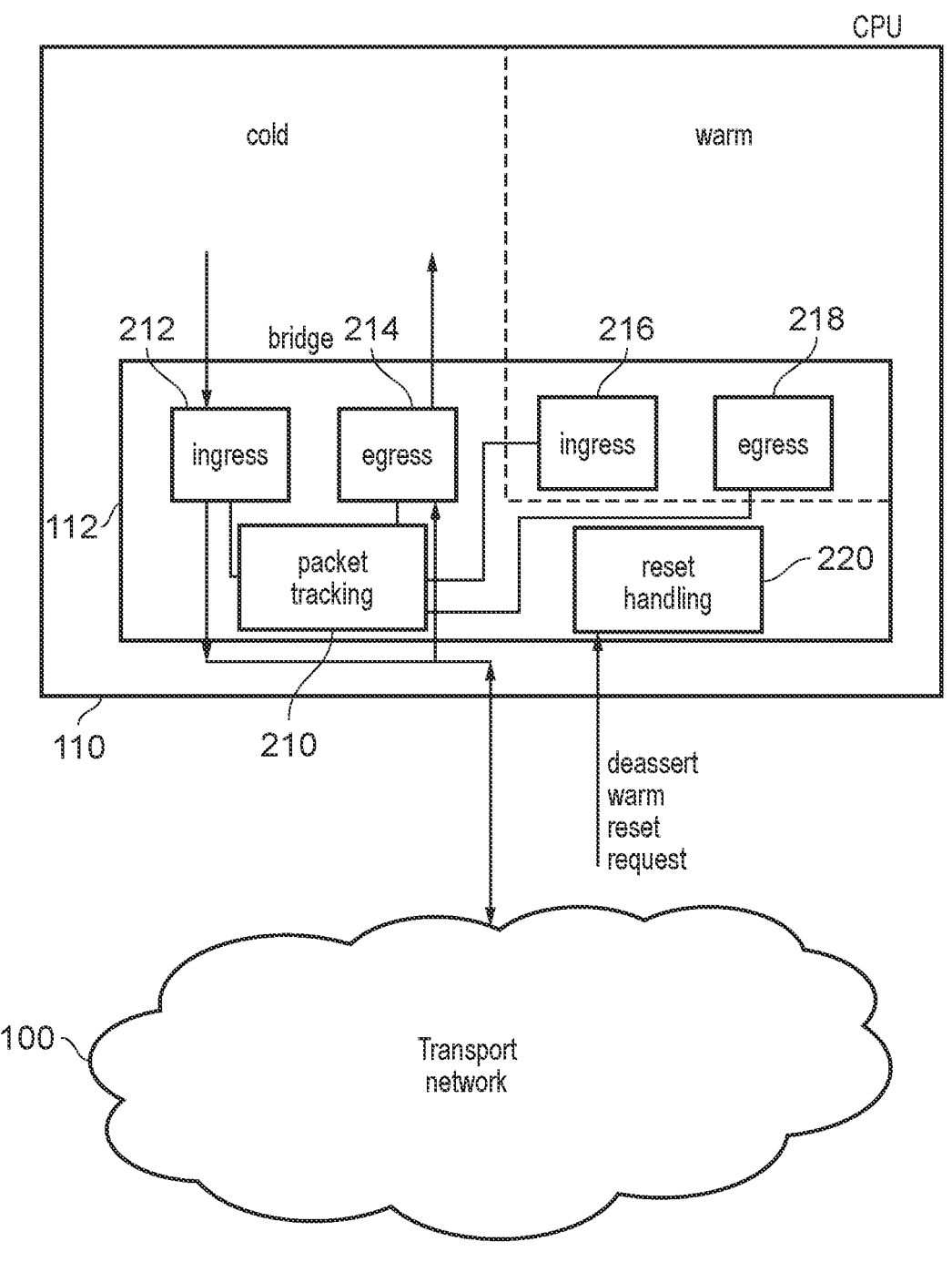
FIGS. 3A-3B schematically illustrate the process of deas-serting a reset in a reset domain of an element of data processing circuitry FIG. 4 schematically illustrates an element of data pro-cessing circuitry with three reset domains.
Figure 3B:
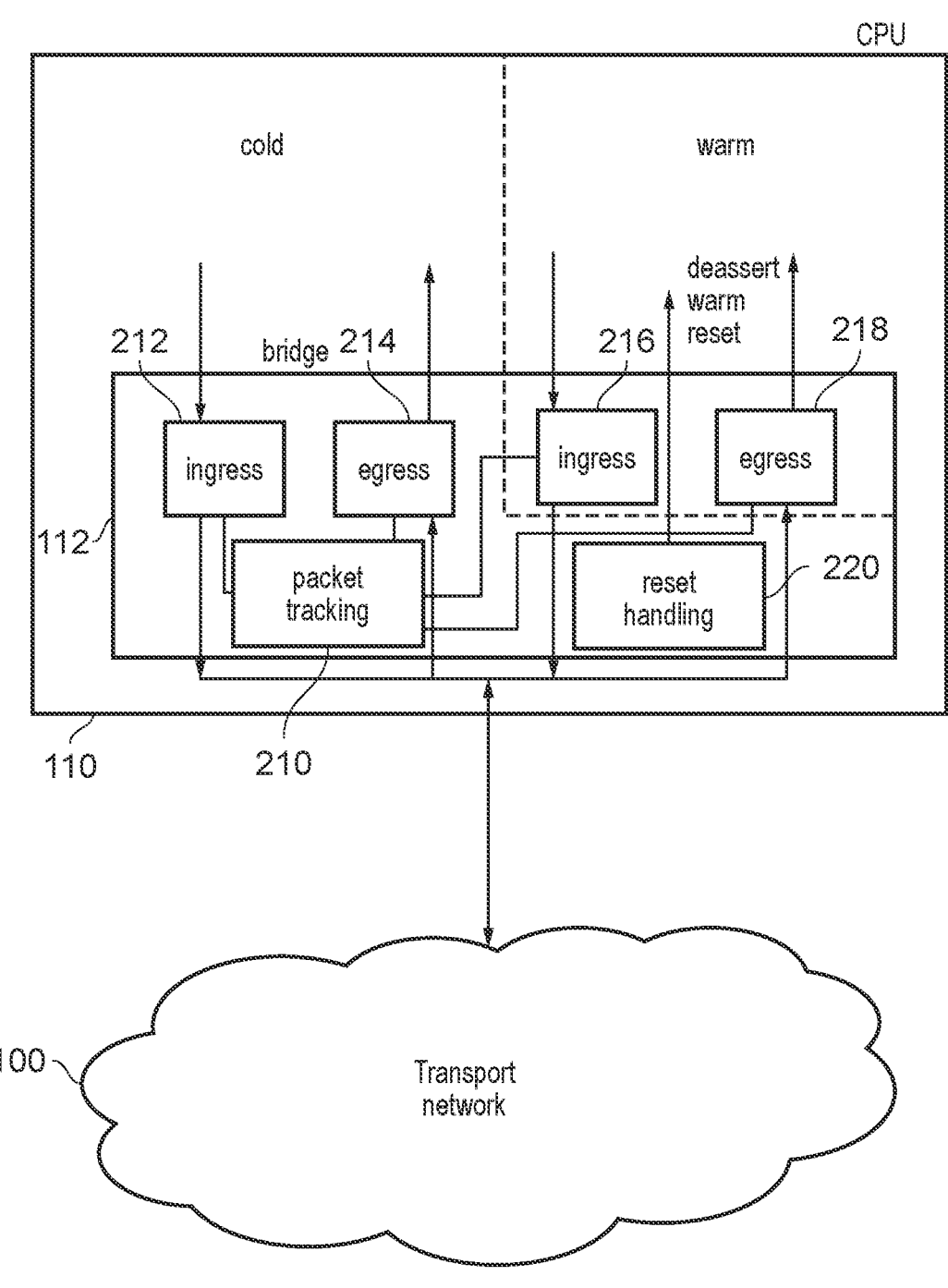

FIGS. 3A-3B schematically illustrate the process of deasserting a reset in a reset domain of an element of data processing circuitry. FIGS. 3A-3B show the same components as depicted in FIGS. 2A-2D and a full discussion of those components will not be repeated.

As shown in FIG. 3A, a request is received by the reset handling circuitry 220 to deassert the warm reset. Since the warm reset domain of the CPU 110 is already in the warm reset state, no warm reset traffic is being handled by the warm reset domain of the CPU 110. The reset handling circuitry 220 need not wait before allowing the warm reset domain of the CPU 110 to transition back to the awake state and so, as depicted in FIG. 3B, the reset handling circuitry sends a request to the warm reset domain of the CPU 110 to deassert the warm reset.

Figure 4:
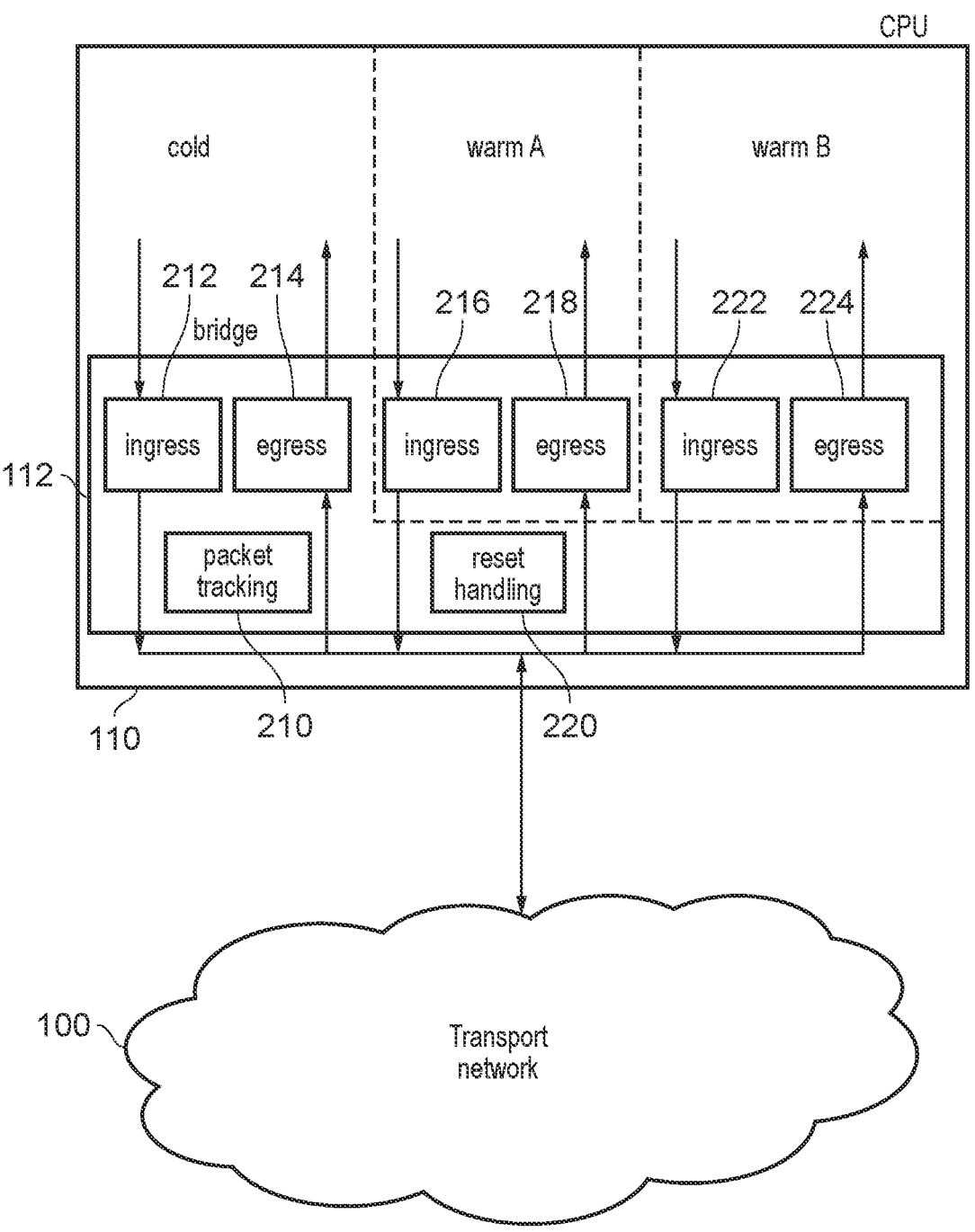

FIG. 4 schematically illustrates an element of data processing circuitry with three reset domains. In this example, the CPU 110 has a cold reset domain, a warm reset domain A and a warm reset domain B. When a cold reset is asserted, a reset is also asserted in the warm A and warm B domains. However, when a warm A reset is asserted, a reset need not be asserted in the cold or warm B domains and similarly when a reset is asserted in the warm B domain, a reset need not be asserted in the cold or warm A domains. In this sense, resets in warm reset domain A and warm reset domain B can be triggered independently. While FIG. 4 depicts a CPU 110 with three reset domains, it should be appreciated that in general a plurality of reset domains may be provided and the reset domains provided within different data processing devices on the transport network 100 may differ.

To assert a reset in either warm reset domain A or warm reset domain B, a similar process to that described with respect to FIGS. 2A-2D is followed. A reset request is received at the reset handling circuitry 220 specifying the reset domain in which the reset is to be asserted. If the reset request specifies the cold reset domain, since the transport network itself as well as warm reset domain A and warm reset domain B will experience the reset, the reset handling circuitry 220 may allow the reset to be taken immediately. However, if the reset request specifies either of the warm reset domains, the reset handling circuitry 220 will notify the data processing circuitry in the respective reset domain and begin rejecting newly received packets targeting that domain. In the meantime, packets for other reset domains will be allowed to be routed to the respective reset domains and responses from the warm reset domain in which the reset is to be asserted are allowed onto the transport network 100. Then, once the packet tracking circuitry 210 indicates that a response has been provided by the warm reset domain in which the reset is to be asserted for all outstanding received requests, the reset handling circuitry 220 allows the reset to be taken. In general this process may be used to manage the assertion of resets in systems with a plurality of reset domains.

Figure 5:
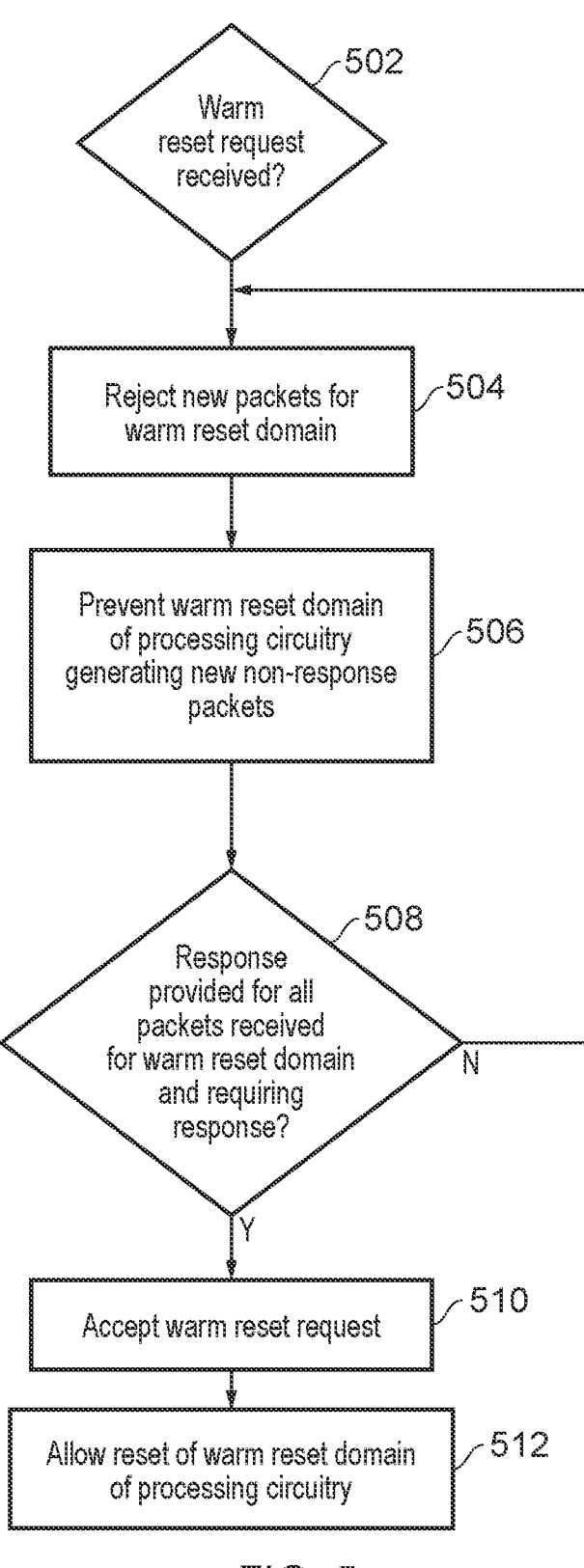
FIG. 5 is a flowchart illustrating a process of asserting a reset in a reset domain.

FIG. 5 is a flowchart illustrating a process of asserting a reset in a reset domain as may be performed by the apparatus described herein. At step 502, a warm reset request is received (e.g., by the reset handling circuitry 220). New packets for the warm reset domain are then rejected at step 504 and the warm reset domain is prevented from generating new packets (other than response packets) at step 506 while the warm reset domain of the data processing circuitry is allowed to provide responses for any transport packets already received from other devices and which require a response. Once all of these responses have been provided as determined at step 508, the warm reset request is accepted at step 510 (e.g., by notifying the PPU that the reset has been accepted) and the reset of the warm reset domain is allowed to occur at step 512.

Figure 6:
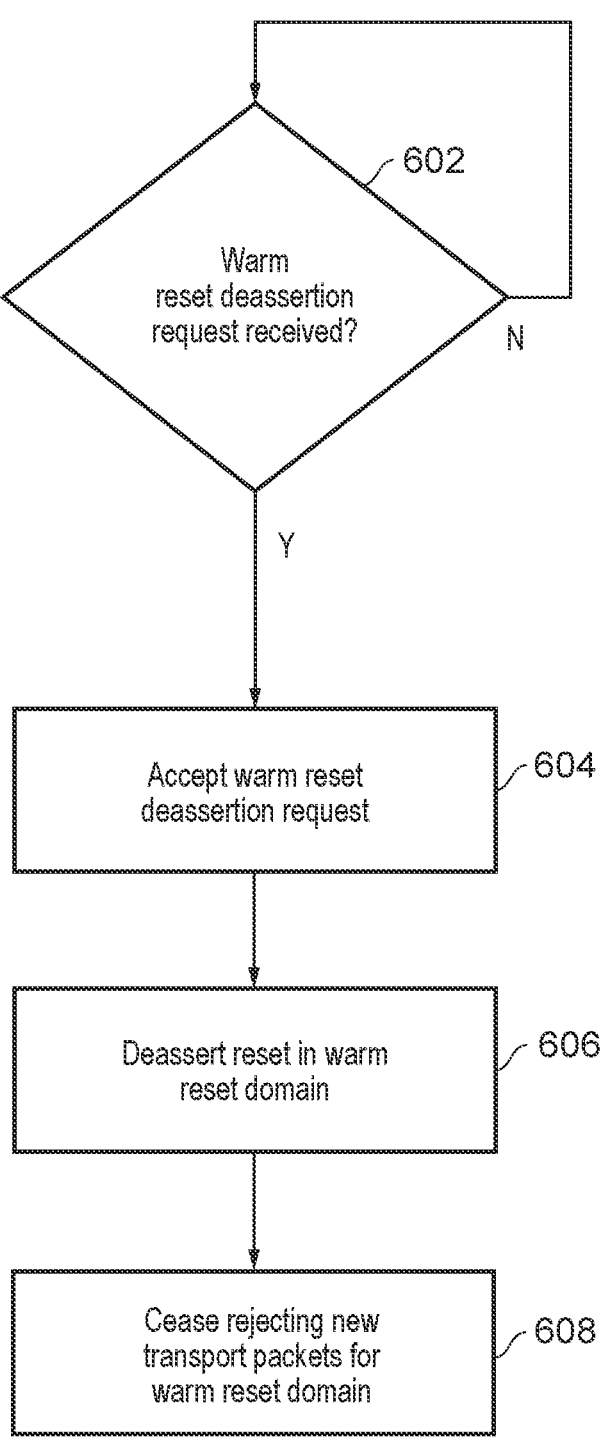
FIG. 6 is a flowchart illustrating a process of deasserting a reset in a reset domain.

FIG. 6 is a flowchart illustrating a process of deasserting a reset in a reset domain. Once the warm reset deassertion request has been received at step 602, the warm reset deassertion request is accepted at step 604 (e.g., by notifying the PPU), the reset in the warm reset domain can be deasserted at step 606, and the reset handling circuitry 220 can cease rejecting new transport packets for the warm reset domain at step 608.

Figure 7:
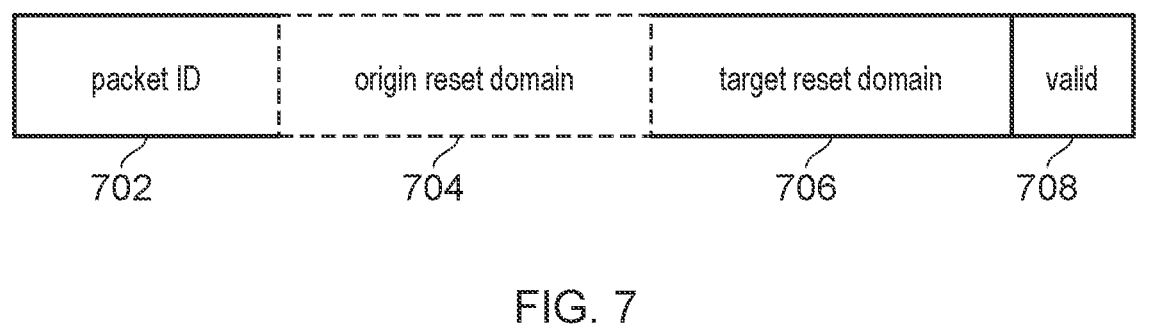

FIG. 7 schematically illustrates an entry of in-flight packet tracking information as used by the packet tracking circuitry 210 to monitor the transport packets received by the data processing circuitry that require a response and the responses provided to them. The entry comprises a packet ID 702 to identify the received transport packet as well as target reset domain information 706 that can be used to identify the reset domain of the data processing circuitry (or portion thereof) to which the transport packet is destined. Based on the target reset domain information 706, the packet tracking circuitry 210 can identify the entries relating to a particular reset domain for which a reset request has been received. For example, if a reset request has been received for a warm reset domain, the packet tracking circuitry 210 may identify, based on the entries specifying the warm reset domain as the target reset domain 706, whether there are any outstanding received requests for which a response has not been provided.

When a transport packet requiring a response is received, the packet tracking circuitry 210 may add a corresponding entry of in-flight packet tracking information. The entry comprises a valid flag 708 and based on a response to the transport packet being provided, the packet tracking circuitry 210 may update the valid flag 708 to invalidate the entry. Thus, when a reset request is later received targeting the target reset domain associated with the entry, that entry may no longer be considered to represent an outstanding request.

In some examples, the entry also includes an indication of the origin reset domain 704. This may be used by the packet tracking circuitry 210 to determine, for a particular entry when a reset request has been asserted, whether a response is required to the transport packet. If the transport packet originated (as determined based on the origin reset domain indication 704) from a reset domain in which a reset is already asserted or from the same reset domain to which the reset request relates, the packet tracking circuitry 210 may determine that a response is not required on the basis that the response will be disregarded anyway due to the reset.

The packet tracking circuitry 210 may be arranged to store an entry for each received transport packet or may only store entries for received transport packets for which a response is required.

Figure 8:
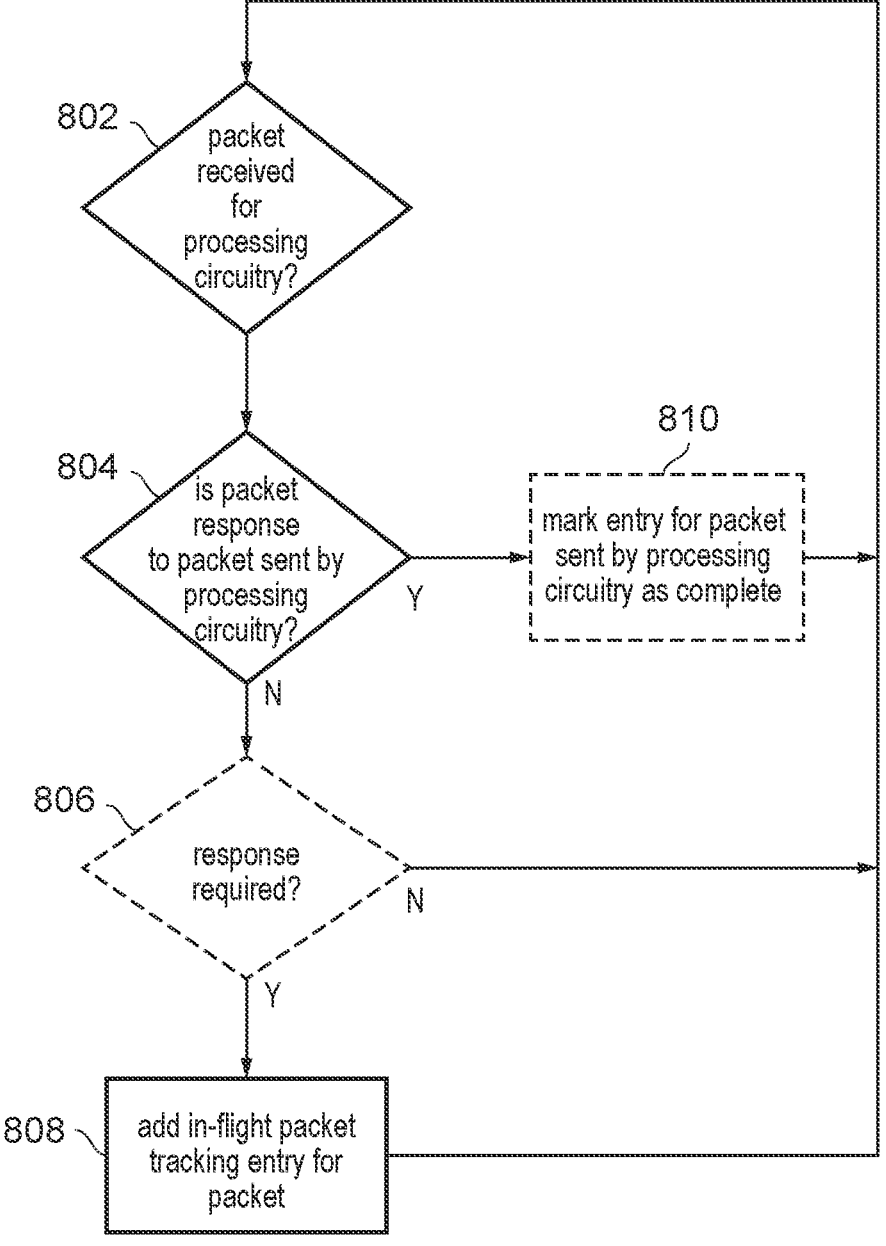
FIG. 8 is a flowchart illustrating a process performed by packet tracking circuitry for an incoming transport packet being received.

FIG. 8 is a flowchart illustrating a process performed by packet tracking circuitry 210 in response to an incoming transport packet (such as a request packet) being received. When a packet is received for processing circuitry at step 802, the packet tracking circuitry 210 determines whether the packet is a response to a packet sent by the processing circuitry at step 804. If the received packet is such a response packet, it may not require a response from the processing circuitry. If the packet tracking circuitry 210 is arranged to also track the outgoing requests and their responses from the data processing circuitry, the packet tracking circuitry 210 may mark an entry corresponding to the outgoing request as complete at step 810.

If the received packet is not a response to a packet sent by the data processing circuitry, the packet tracking circuitry 210 may determine whether a response is required at step 806. In some examples, this step will not be needed as all packets received by the data processing circuitry (that are not themselves a response) will require a response. However, in some examples, the packet tracking circuitry 210 may determine whether a response is required based on a domain of origin of the packet and/or a type of packet that is received. If a response is required to the received packet, the packet tracking circuitry 210 adds an in-flight packet tracking entry (e.g., of the form shown in FIG. 7) to in-flight packet tracking information at step 808 to track when the response is provided.

Figure 9:
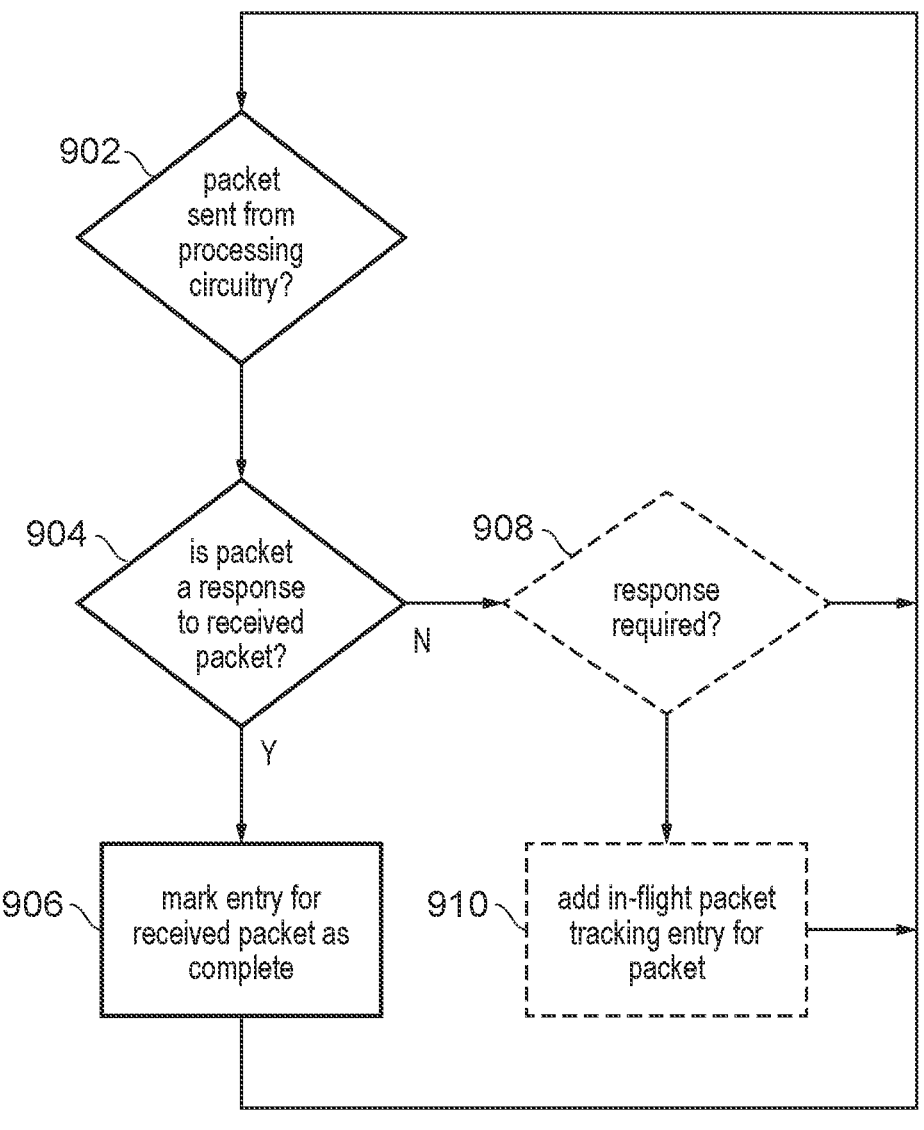
FIG. 9 is a flowchart illustrating a process performed by packet tracking circuitry for an outgoing transport packet.

FIG. 9 is a flowchart illustrating a process performed by packet tracking circuitry 210 for an outgoing transport packet from the data processing circuitry. When a packet is sent from the processing circuitry, as determined at step 902, the packet tracking circuitry 210 determines whether the packet being sent is a response packet being sent in response to a received transport packet that required a response at step 904. If the packet is a response packet, the packet tracking circuitry 210 can mark the corresponding entry in the in-flight packet tracking information as invalid at step 906 to indicate that the response has been provided. Consequently, in response to a reset request for the domain to which the packet relates, the packet tracking circuitry 210 will no longer delay the assertion of the reset in order to allow the response to be provided.

On the other hand, if the outgoing packet was determined not to be a response packet at step 904, in some examples, the packet tracking circuitry 210 may be arranged to track whether a response is required for that packet and whether such a response has been received. Thus, at step 908 the packet tracking circuitry 210 determines whether a response to the outgoing packet is required (e.g., based on the type of packet being sent) and at step 910, adds an in-flight packet tracking entry for the packet.

Concepts described herein may be embodied in a system comprising at least one packaged chip. The apparatus described earlier is implemented in the at least one packaged chip (either being implemented in one specific chip of the system, or distributed over more than one packaged chip). The at least one packaged chip is assembled on a board with at least one system component. A chip-containing product may comprise the system assembled on a further board with at least one other product component. The system or the chip-containing product may be assembled into a housing or onto a structural support (such as a frame or blade).

Figure 10:
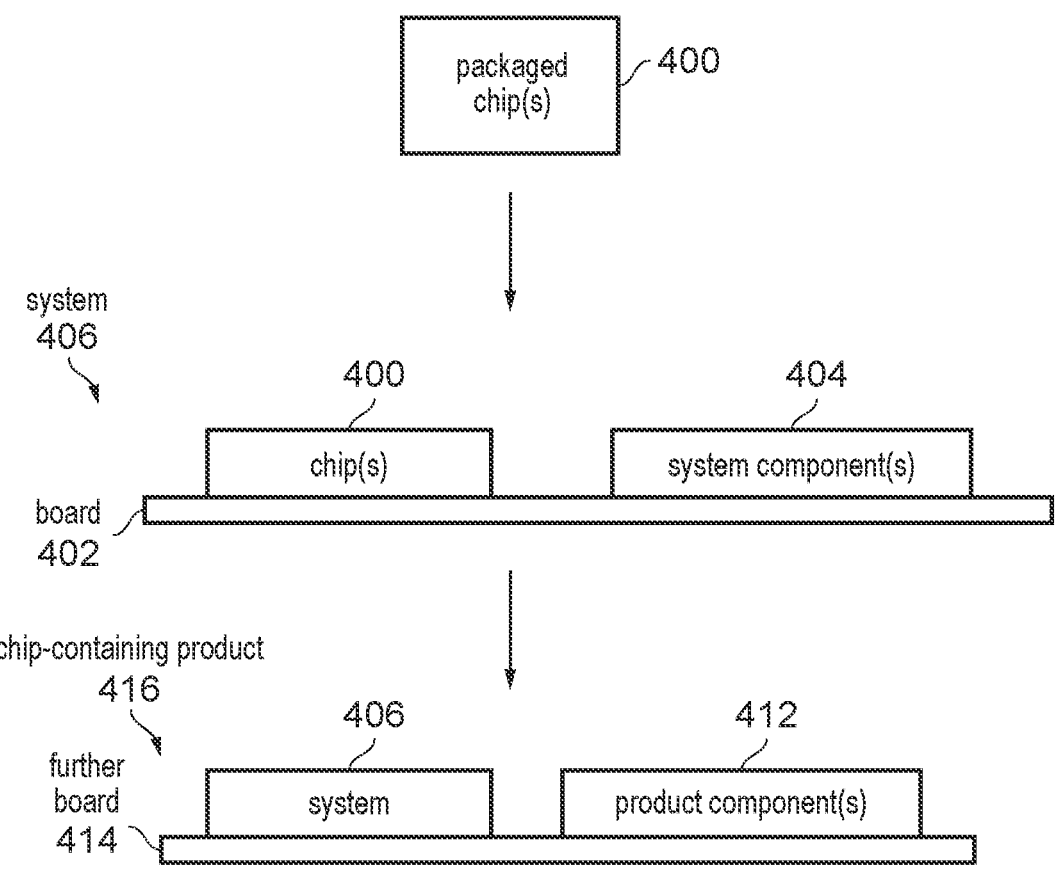
FIG. 10 schematically illustrates a packaged chip, a system with the packaged chip, and a chip-containing prod-uct with the system.

As shown in FIG. 10, one or more packaged chips 400, with the apparatus described above implemented on one chip or distributed over two or more of the chips, are manufactured by a semiconductor chip manufacturer. In some examples, the chip product 400 made by the semiconductor chip manufacturer may be provided as a semiconductor package which comprises a protective casing (e.g. made of metal, plastic, glass or ceramic) containing the semiconductor devices implementing the [apparatus/circuitry] described above and connectors, such as lands, balls or pins, for connecting the semiconductor devices to an external environment. Where more than one chip 400 is provided, these could be provided as separate integrated circuits (provided as separate packages), or could be packaged by the semiconductor provider into a multi-chip semiconductor package (e.g. using an interposer, or by using three-dimensional integration to provide a multi-layer chip product comprising two or more vertically stacked integrated circuit layers).

In some examples, a collection of chiplets (i.e. small modular chips with particular functionality) may itself be referred to as a chip. A chiplet may be packaged individually in a semiconductor package and/or together with other chiplets into a multi-chiplet semiconductor package (e.g. using an interposer, or by using three-dimensional integration to provide a multi-layer chiplet product comprising two or more vertically stacked integrated circuit layers).

The one or more packaged chips 400 are assembled on a board 402 together with at least one system component 404 to provide a system 406. For example, the board may comprise a printed circuit board. The board substrate may be made of any of a variety of materials, e.g. plastic, glass, ceramic, or a flexible substrate material such as paper, plastic or textile material. The at least one system component 404 comprise one or more external components which are not part of the one or more packaged chip(s) 400. For example, the at least one system component 404 could include, for example, any one or more of the following: another packaged chip (e.g. provided by a different manufacturer or produced on a different process node), an interface module, a resistor, a capacitor, an inductor, a transformer, a diode, a transistor and/or a sensor.

A chip-containing product 416 is manufactured comprising the system 406 (including the board 402, the one or more chips 400 and the at least one system component 404) and one or more product components 412. The product components 412 comprise one or more further components which are not part of the system 406. As a non-exhaustive list of examples, the one or more product components 412 could include a user input/output device such as a keypad, touch screen, microphone, loudspeaker, display screen, haptic device, etc.; a wireless communication transmitter/receiver; a sensor; an actuator for actuating mechanical motion; a thermal control device; a further packaged chip; an interface module; a resistor; a capacitor; an inductor; a transformer; a diode; and/or a transistor. The system 406 and one or more product components 412 may be assembled on to a further board 414.

The board 402 or the further board 414 may be provided on or within a device housing or other structural support (e.g. a frame or blade) to provide a product which can be handled by a user and/or is intended for operational use by a person or company.

The system 406 or the chip-containing product 416 may be at least one of: an end-user product, a machine, a medical device, a computing or telecommunications infrastructure product, or an automation control system. For example, as a non-exhaustive list of examples, the chip-containing product could be any of the following: a telecommunications device, a mobile phone, a tablet, a laptop, a computer, a server (e.g. a rack server or blade server), an infrastructure device, networking equipment, a vehicle or other automotive product, industrial machinery, consumer device, smart card, credit card, smart glasses, avionics device, robotics device, camera, television, smart television, DVD players, set top box, wearable device, domestic appliance, smart meter, medical device, heating/lighting control device, sensor, and/ or a control system for controlling public infrastructure equipment such as smart motorway or traffic lights.

Thus there has been described a technique by which bridge circuitry is able to delay the assertion of a reset in a particular reset domain until any outstanding requests received by processing circuitry in that reset domain have been dealt with. This may help to prevent the occurrence of deadlocks that could otherwise result from devices in the system awaiting a response from the processing circuitry that has been subject to the reset domain that will not be provided due to the reset having been asserted. This can therefore improve the reliability of data processing apparatuses.

The techniques described herein are illustrated with reference to the following examples.

Example 1. An apparatus comprising:
bridge circuitry operable to communicate transport packets between a transport network and data processing circuitry, at least a portion of the data processing circuitry operating in a given reset domain other than a reset domain of the transport network;
packet tracking circuitry to monitor the transport packets received at the bridge circuitry and, for transport packets that require a response by the data processing circuitry, to track whether the response has been provided; and
reset handling circuitry responsive to a reset request for the given reset domain to:
cause the bridge circuitry to reject new transport packets received for the given reset domain; and
when the packet tracking circuitry indicates that a response has been provided for the transport packets associated with the given reset domain that require a response, accept the reset request for the given reset domain and allow the data processing circuitry to carry out a reset for the at least a portion of the data processing circuitry operating in the given reset domain.

Example 2. The apparatus according to example 1, wherein the packet tracking circuitry is configured to determine that a response is required for transport packets in dependence on a reset domain from which the transport packets originated.

Example 3. The apparatus according to example 1 or example 2, wherein the packet tracking circuitry is configured to determine that a response is required for transport packets associated with the given reset domain based on the transport packets originating from a reset domain for which a reset is unasserted.

Example 4. The apparatus according to any preceding example, wherein the packet tracking circuitry is configured to determine that a response is not required based on the transport packets being request packets.

Example 5. The apparatus according to any preceding example, wherein the reset handling circuitry is responsive to a reset deassertion request for the given reset domain to:
allow the data processing circuitry to deassert the reset for the at least a portion of the data processing circuitry operating in the given reset domain;
cease rejecting new transport packets received for the given reset domain; and
accept the deassertion request.

Example 6. The apparatus according to any preceding example, wherein the reset handling circuitry is responsive to the reset request for the given reset domain to prevent the data processing circuitry generating new transport packets associated with the given reset domain.

Example 7. The apparatus according to any preceding example, wherein all of the data processing circuitry operates in the given reset domain.

Example 8. The apparatus according to any preceding example, wherein:
a second portion of the data processing circuitry operates in a third reset domain other than the reset domain of the transport network and the given reset domain; and
the bridge circuitry is responsive to receiving transport packets for the second portion of the data processing circuitry when the reset in the given reset domain is asserted and a reset in the third reset domain is unasserted to communicate the transport packets to the second portion of the data processing circuitry.

Example 9. The apparatus according to example 8, wherein the reset handling circuitry is responsive to a reset request for the second reset domain to:
cause the bridge circuitry to reject new transport packets received for the third reset domain; and
when the packet tracking circuitry indicates that a response has been provided for transport packets associated with the third reset domain that require a response, accept the reset request for the third reset domain and allow the data processing circuitry to carry out a reset for the second portion of the data processing circuitry.

Example 10. The apparatus according to any preceding example wherein the packet handling circuitry and the reset handling circuitry operate in the same reset domain as the transport network.

Example 11. The apparatus according to any preceding example, wherein the reset handling circuitry is responsive to a reset request for the reset domain of the transport network to:

accept the reset request for the reset domain of the transport network; and allow the data processing circuitry to carry out a reset.

Example 12. The apparatus according to any preceding example wherein:

the packet tracking circuitry is configured to maintain in-flight packet tracking information indicative of received transport packets that require a response by the data processing circuitry; and the packet tracking circuitry is responsive to a new transport packet being received for the data processing circuitry for which a reset request is not asserted to add a packet tracking information entry indicative of the new transport packet and a reset domain with which the new transport packet is associated.

Example 13. The apparatus according to example 12, wherein the packet tracking circuitry is responsive to a response being sent by the data processing circuitry in response to the new transport packet to update the packet tracking information entry to indicate that the response has been provided.

Example 14. The apparatus according to example 13, wherein the packet tracking circuitry is configured to determine whether a response has been provided for transport packets associated with the particular reset domain based on packet tracking information entries for the particular reset domain.

Example 15. The apparatus according to any preceding example wherein to reject the new transport packets received for the given reset domain, the bridge circuitry is configured to respond to the new transport packets with a rejection packet.

Example 16. The apparatus according to any preceding example, wherein the data processing circuitry is operable as a sender and receiver configured to send and receive transport packets over the transport network.

Example 17. An apparatus according to any preceding example wherein:

the reset handling circuitry is responsive to the reset request for the given reset domain to provide an indication to the at least a portion of the data processing circuitry operating in the given reset domain of the reset request; and the reset handling is configured to delay accepting the reset request until the at least a portion of the data processing circuitry indicates that the at least a portion of the data processing circuitry is ready to carry out the reset.

Example 18. The apparatus according to any preceding example, further comprising the data processing circuitry and/or the transport network.

Example 19. A system comprising:

the apparatus of any preceding example, implemented in at least one packaged chip;

at least one system component; and a board, wherein the at least one packaged chip and the at least one system component are assembled on the board.

Example 20. A chip-containing product comprising the system of example 18 assembled on a further board with at least one other product component.

Example 21. A non-transitory computer-readable medium to store computer-readable code for fabrication of an apparatus comprising:

bridge circuitry operable to communicate transport packets between a transport network and data processing circuitry, at least a portion of the data processing circuitry operating in a given reset domain other than a reset domain of the transport network;

packet tracking circuitry to monitor the transport packets received at the bridge circuitry and, for transport packets that require a response by the data processing circuitry, to track whether the response has been provided; and reset handling circuitry responsive to a reset request for the given reset domain to:

cause the bridge circuitry to reject new transport packets received for the given reset domain; and when the packet tracking circuitry indicates that a response has been provided for transport packets associated with the given reset domain that require a response, accept the reset request for the given reset domain and allow the data processing circuitry to carry out a reset for the at least a portion of the data processing circuitry operating in the given reset domain.

Example 22. A method of handling resets, the method comprising:

communicating transport packets between a transport network and data processing circuitry, at least a portion of the data processing circuitry operating in a given reset domain other than a reset domain of the transport network;

monitoring the transport packets received and, for transport packets that require a response by the data processing circuitry, tracking whether the response has been provided;

responsive to a reset request for the given reset domain:

causing the bridge circuitry to reject new transport packets received for the given reset domain; and further in response to the tracking indicate that a response has been provided for transport packets associated with the given reset domain that require a response, accepting the reset request for the given reset domain and allowing the data processing circuitry to carry out a reset for the at least a portion of the data processing circuitry operating in the given reset domain.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

The invention claimed is:

1. An apparatus comprising:
bridge circuitry operable to communicate transport packets between a transport network and data processing circuitry, at least a portion of the data processing circuitry operating in a given reset domain other than a reset domain of the transport network;
packet tracking circuitry to monitor the transport packets received at the bridge circuitry and, for transport packets that require a response by the data processing circuitry, to track whether the response has been provided; and
reset handling circuitry responsive to a reset request for the given reset domain to:
  cause the bridge circuitry to reject new transport packets received for the given reset domain; and
  when the packet tracking circuitry indicates that a response has been provided for the transport packets associated with the given reset domain that require a response, accept the reset request for the given reset domain and allow the data processing circuitry to carry out a reset for the at least a portion of the data processing circuitry operating in the given reset domain.

2. The apparatus according to claim 1, wherein the packet tracking circuitry is configured to determine that a response is required for transport packets in dependence on a reset domain from which the transport packets originated.

3. The apparatus according to claim 2, wherein the packet tracking circuitry is configured to determine that a response is required for transport packets associated with the given reset domain based on the transport packets originating from a reset domain for which a reset is unasserted.

4. The apparatus according to claim 1, wherein the packet tracking circuitry is configured to determine that a response is required based on the transport packets being request packets.

5. The apparatus according to claim 1, wherein the reset handling circuitry is responsive to a reset deassertion request for the given reset domain to:
  allow the data processing circuitry to deassert the reset for the at least a portion of the data processing circuitry operating in the given reset domain;
  cease rejecting new transport packets received for the given reset domain; and
  accept the deassertion request.

6. The apparatus according to claim 1, wherein the reset handling circuitry is responsive to the reset request for the given reset domain to prevent the data processing circuitry generating new transport packets associated with the given reset domain.

7. The apparatus according to claim 1, wherein:
a second portion of the data processing circuitry operates in a third reset domain other than the reset domain of the transport network and the given reset domain; and
the bridge circuitry is responsive to receiving transport packets for the second portion of the data processing circuitry when the reset in the given reset domain is asserted and a reset in the third reset domain is unasserted to communicate the transport packets to the second portion of the data processing circuitry.

8. The apparatus according to claim 7, wherein the reset handling circuitry is responsive to a reset request for the second reset domain to:
  cause the bridge circuitry to reject new transport packets received for the third reset domain; and when the packet tracking circuitry indicates that a response has been provided for transport packets associated with the third reset domain that require a response, accept the reset request for the third reset domain and allow the data processing circuitry to carry out a reset for the second portion of the data processing circuitry.

9. The apparatus according to claim 1 wherein the packet handling circuitry and the reset handling circuitry operate in the same reset domain as the transport network.

10. The apparatus according to claim 1, wherein the reset handling circuitry is responsive to a reset request for the reset domain of the transport network to:
  accept the reset request for the reset domain of the transport network; and
  allow the data processing circuitry to carry out a reset.

11. The apparatus according to claim 1 wherein:
the packet tracking circuitry is configured to maintain in-flight packet tracking information indicative of received transport packets that require a response by the data processing circuitry; and
the packet tracking circuitry is responsive to a new transport packet for which a response is required being received for the data processing circuitry to add a packet tracking information entry indicative of the new transport packet and a reset domain with which the new transport packet is associated.

12. The apparatus according to claim 11, wherein the packet tracking circuitry is responsive to a response being sent by the data processing circuitry in response to the new transport packet to update the packet tracking information entry to indicate that the response has been provided.

13. The apparatus according to claim 12, wherein the packet tracking circuitry is configured to determine whether a response has been provided for transport packets associated with the particular reset domain based on packet tracking information entries for the particular reset domain.

14. The apparatus according to claim 1 wherein to reject the new transport packets received for the given reset domain, the bridge circuitry is configured to respond to the new transport packets with a rejection packet.

15. The apparatus according to claim 1, wherein the data processing circuitry is operable as a sender and receiver configured to send and receive transport packets over the transport network.

16. The apparatus according to claim 1, further comprising the data processing circuitry and/or the transport network.

17. A system comprising:
the apparatus of claim 1, implemented in at least one packaged chip;
at least one system component; and
a board,
wherein the at least one packaged chip and the at least one system component are assembled on the board.

18. A chip-containing product comprising the system of claim 17 assembled on a further board with at least one other product component.

19. A non-transitory computer-readable medium to store computer-readable code for fabrication of an apparatus comprising:
  bridge circuitry operable to communicate transport packets between a transport network and data processing circuitry, at least a portion of the data processing circuitry operating in a given reset domain other than a reset domain of the transport network;

packet tracking circuitry to monitor the transport packets received at the bridge circuitry and, for transport packets that require a response by the data processing circuitry, to track whether the response has been provided; and reset handling circuitry responsive to a reset request for the given reset domain to:

cause the bridge circuitry to reject new transport packets received for the given reset domain; and when the packet tracking circuitry indicates that a response has been provided for transport packets associated with the given reset domain that require a response, accept the reset request for the given reset domain and allow the data processing circuitry to carry out a reset for the at least a portion of the data processing circuitry operating in the given reset domain.

20. A method of handling resets, the method comprising:

communicating transport packets between a transport network and data processing circuitry, at least a portion of the data processing circuitry operating in a given reset domain other than a reset domain of the transport network;

monitoring the transport packets received and, for transport packets that require a response by the data processing circuitry, tracking whether the response has been provided;

responsive to a reset request for the given reset domain:

causing the bridge circuitry to reject new transport packets received for the given reset domain; and further in response to the tracking indicate that a response has been provided for transport packets associated with the given reset domain that require a response, accepting the reset request for the given reset domain and allowing the data processing circuitry to carry out a reset for the at least a portion of the data processing circuitry operating in the given reset domain.

\* \* \* \* \*